(12) United States Patent
Anonen et al.

(10) Patent No.: US 10,648,613 B1
(45) Date of Patent: May 12, 2020

(54) METHODS AND DEVICES FOR SECURING DEVICES AND ACCESSORIES TO A TRACK SYSTEM

(71) Applicant: Brunswick Corporation, Mettawa, IL (US)

(72) Inventors: Daniel R. Anonen, Ottertail, MN (US); Kyle D. Kaldor, Perham, MN (US); Bill Witt, Perham, MN (US)

(73) Assignee: Brunswick Corporation, Mettawa, IL (US)

( * ) Notice: Subject to any disclaimer, the term of this patent is extended or adjusted under 35 U.S.C. 154(b) by 0 days.

(21) Appl. No.: 16/194,912

(22) Filed: Nov. 19, 2018

(51) Int. Cl.
*F16M 13/00* (2006.01)
*F16M 13/02* (2006.01)
*B63B 17/00* (2006.01)

(52) U.S. Cl.
CPC ........... *F16M 13/022* (2013.01); *B63B 17/00* (2013.01)

(58) Field of Classification Search
CPC ............................. B60N 2/0705; B60N 2/0806
USPC .......... 248/225.11, 224.51, 224.61, 424, 429
See application file for complete search history.

(56) References Cited

U.S. PATENT DOCUMENTS

| | | | |
|---|---|---|---|
| 5,775,251 A | 7/1998 | Morningstar | |
| 6,293,622 B1 * | 9/2001 | Horisawa | B60N 2/01591 248/429 |
| 6,299,120 B1 * | 10/2001 | Girardi | B60N 2/01541 248/429 |
| 7,341,231 B2 | 3/2008 | Zarn | |
| 7,566,086 B2 * | 7/2009 | Gray | H04L 12/2856 296/65.03 |
| 7,980,798 B1 | 7/2011 | Kuehn et al. | |
| 7,992,914 B2 * | 8/2011 | Maier | B60N 2/062 248/394 |
| 8,132,772 B1 * | 3/2012 | Thomas | F16O 29/004 248/429 |
| 8,172,195 B2 * | 5/2012 | Fanucci | B63B 29/06 248/429 |
| 8,230,628 B2 * | 7/2012 | Recker | E01F 9/669 40/606.14 |
| 9,273,825 B1 | 3/2016 | Holloway et al. | |
| 2010/0158605 A1 | 6/2010 | Gargaro, III et al. | |
| 2015/0211556 A1 | 7/2015 | Alexander et al. | |

* cited by examiner

*Primary Examiner* — Steven M Marsh
(74) *Attorney, Agent, or Firm* — Andrus Intellectual Property Law, LLP (57) ABSTRACT

A device for securing accessories to a track having an entrance height. The device includes a main body defining an axle opening and being configured to couple to the accessory. A track bolt has an axle extending to a head, which is rotatably received in the axle opening. The head has a long length greater than the entrance height and a short length less than the entrance height. A handle is fixed to the track bolt, which rotate together. A ramp and a riding surface are disposed between the handle and the front of the main body, the riding surface engaging the ramp from a low end and a high end. When the head is inserted into the track and the handle is rotated such that the riding surface engages the high end of the ramp, the head is drawn into compression with the track to secure the device.

20 Claims, 12 Drawing Sheets

FIG. 1

DETAIL A-A
FIG. 2

SECTION B-B
FIG. 6C

FIG. 9C SECTION D-D

FIG. 13C
SECTION E-E

METHODS AND DEVICES FOR SECURING DEVICES AND ACCESSORIES TO A TRACK SYSTEM

FIELD

The present disclosure generally relates to devices for securing accessories to modular track and cam systems, and more particularly to devices for securing accessories to modular track and cam systems for marine vessels.

BACKGROUND

The Background and Summary are provided to introduce a foundation and selection of concepts that are further described below in the Detailed Description. The Background and Summary are not intended to identify key or essential features of the claimed subject matter, nor are they intended to be used as an aid in limiting the scope of the claimed subject matter.

The following U.S. Patents and Patent Applications are incorporated herein by reference:

U.S. Pat. No. 9,079,534 discloses a modular track and cam storage system for marine vessels comprising a track extrusion having a c-channel, and a cam latch assembly comprising a latch, a bolt, and a cam. The cam is substantially rectangular in shape having at least two rounded opposing corners. The cam of the cam latch assembly is configured to be horizontally received in the c-channel of the track extrusion and is configured to be rotated within the c-channel such that the cam is slideably engaged with said track extrusion. Manipulating the latch will cause the cam to rotate, in order to manually engage the cam latch assembly with the track extrusion. The cam is capable of being locked within said c-channel by flipping the latch downward about the bolt. The cam latch assembles are attached to a storage accessory such as a storage bag, a trash bag, a cup holder, a basin, a rod holder.

SUMMARY

One embodiment of the present disclosure generally relates to a device for securing an accessory to a track, where the track has an entrance wall defining an entrance height and the track defines an interior space having an interior height. The device includes a main body configured to be coupled to the accessory, where the main body has a front and a back and defines an axle opening therebetween. A track bolt has an axle that extends between a front end and a head, where the axle is rotatably received in the axle opening. The head has a long length that is greater than the entrance height and a short length that is less than the entrance height of the track. A handle is fixed to the front end of the track bolt such that rotating the handle rotates the track bolt about the axle. A ramp and a riding surface are each disposed between the handle and the front of the main body, where the ramp transitions from a low end and a high end and the riding surface engages the ramp. Rotating the handle moves the riding surface between the low end and the high end of the ramp. When the head of the track bolt is inserted into the track and the handle is rotated such that the riding surface engages the high end of the ramp, the head is drawn into compression with the entrance wall of the track to secure the device to the track.

Another embodiment generally relates to a device for securing an accessory to a track, where the track defines an entrance wall having an entrance height and an interior space having an interior height. The device includes a main body configured to be coupled to the accessory, where the main body has a front and a back and defines an axle opening therebetween. A track bolt has an axle that extends between a front end and a head, where the axle is rotatably received in the axle opening. The head has a long length that is greater than the entrance height of the track and a short length that is less than the entrance height. A handle is fixed to the front end of the track bolt such that rotating the handle rotates the track bolt about the axle. The handle has a locked position in which the head of the track bolt is retained within the track and an unlocked position in which the head is removable from the track. A locking member is releaseably engageable between the handle and the main body to prevent relative rotation therebetween when the handle is in the locked position. The device is secured to the track when the head of the track bolt is inserted into the track and the handle is rotated to the locked position.

Another embodiment generally relates to a device for securing an accessory to a track, where the track defines an entrance wall having an entrance height and an interior space having an interior height. The device includes a main body configured to be coupled to the accessory, where the main body has a front and a back and defines an axle opening therebetween. A stabilizer tab extends from the back of the main body and is receivable within the track. A track bolt has an axle that extends between a front end and a head, where the axle is rotatably received in the axle opening. The head has a long length that is greater than the entrance height of the track and a short length that is less than the entrance height. A handle is fixed to the front end of the track bolt such that rotating the handle rotates the track bolt about the axle between a locked position in which the head of the track bolt is retained within the track and an unlocked position in which the head is removable from the track. The device is secured to the track when the head of the track bolt is inserted into the track and rotated to the locked position. The stabilizer tab prevents rotation of the device about the axle when the device is secured to the track.

Various other features, objects and advantages of the disclosure will be made apparent from the following description taken together with the drawings.

BRIEF DESCRIPTION OF THE DRAWINGS

The drawings illustrate embodiments for carrying out the disclosure. The same numbers are used throughout the drawings to reference like features and like components. In the drawings.

DETAILED DISCLOSURE

This written description uses examples to disclose embodiments of the present disclosure and also to enable any person skilled in the art to practice or make and use the same. The patentable scope of the invention is defined by the claims and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In the present description, certain terms have been used for brevity, clarity, and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives, and modifications are possible within the scope of the appended claims. Each limitation in the appended claims is intended to invoke interpretation under 35 USC § 112(f), only if the terms "means for" or "step for" are explicitly recited in the respective limitation.

The present disclosure generally relates to systems and devices securing or mounting accessories to a track and cam system, such as those commonly provided for marine vessels. The present inventors have identified that the devices for securing accessories to track and cam systems presently known in the art are time consuming and difficult to attach, remove, or move within the marine vessel's tracks. Moreover, many of these devices require the use of tools, further hindering the process of attaching, removing, or moving the accessory as needed.

FIGS. 1-3D disclose an exemplary embodiment of an improved device 1 for securing an accessory (not shown) to a track 4 such as would be provided in a marine vessel, for example, a Lund SportTrack. As can also be seen in the close-up of FIG. 2, the track 4 is generally C-shaped and defines an interior space 6 therein. The track 4 has an entrance wall 5 at the front with an entrance height H1 defined therein to provide access to this interior space 6. In the example shown, the interior space 6 has an interior height H2 and a depth D1 between the entrance wall 5 and a back wall 7. Additional information regarding the track 4 and track and cam mounting systems known in the art more generally is provided in U.S. Pat. No. 9,079,534, which is incorporated by reference herein. In general, U.S. Pat. No. 9,079,534 discloses a device for mounting accessories to such a track 4 in which the device has a rotating cam (akin to the track bolt 50 described below) that is inserted into the entrance wall 5, then rotated such that the cam is trapped within the interior space 6 of the track 4.

Figures 11A, 11B:
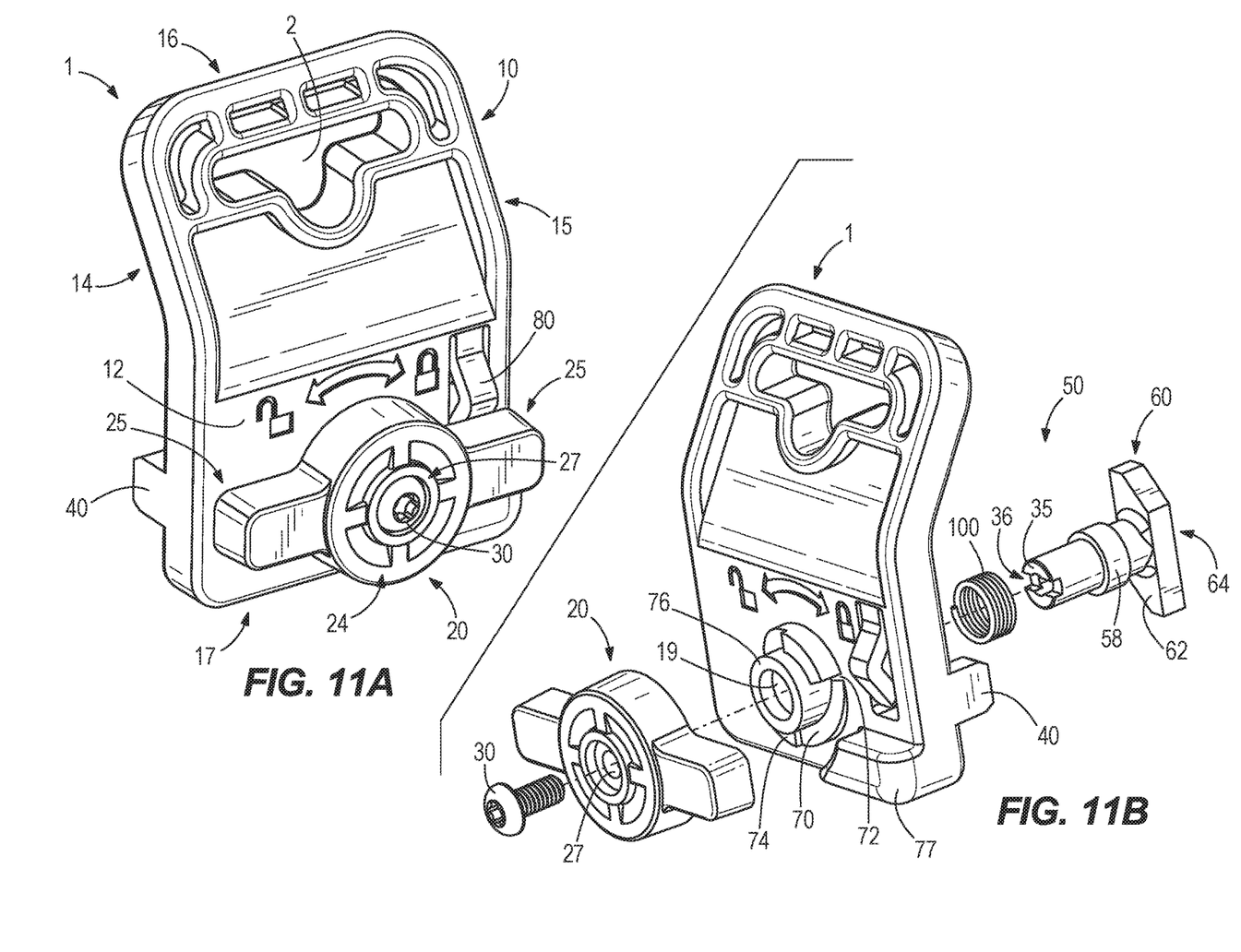
FIGS. 11A-11B depict front isometric and exploded views of an alternative embodiment of a device according to the present disclosure.
Figure 12:
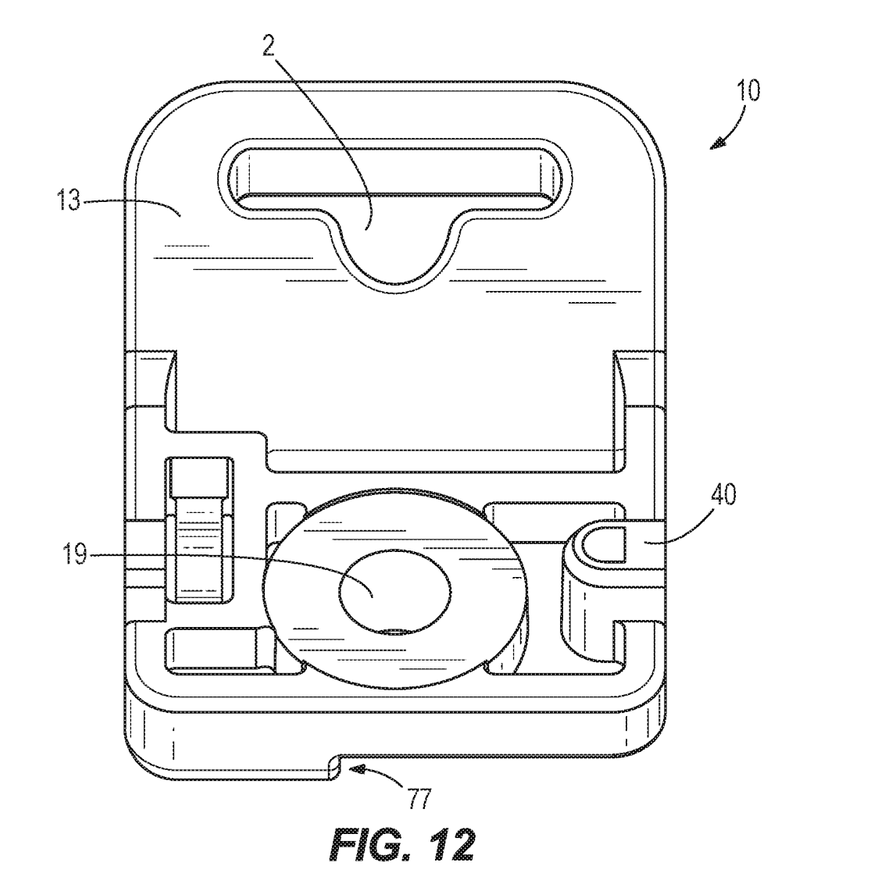
FIG. 12 depicts a rear isometric view of the device shown in FIGS. 11A-11B.
Figure 13A:
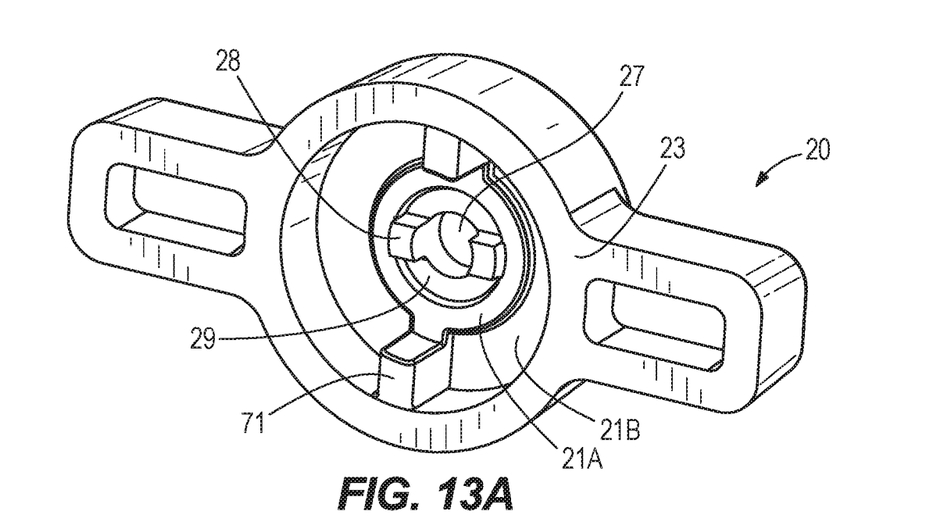
FIGS. 13A-13D depict rear isometric, front, sectional side, and rear views of an exemplary handle for a device such as that shown in FIGS. 11A-11B.
Figure 13B:
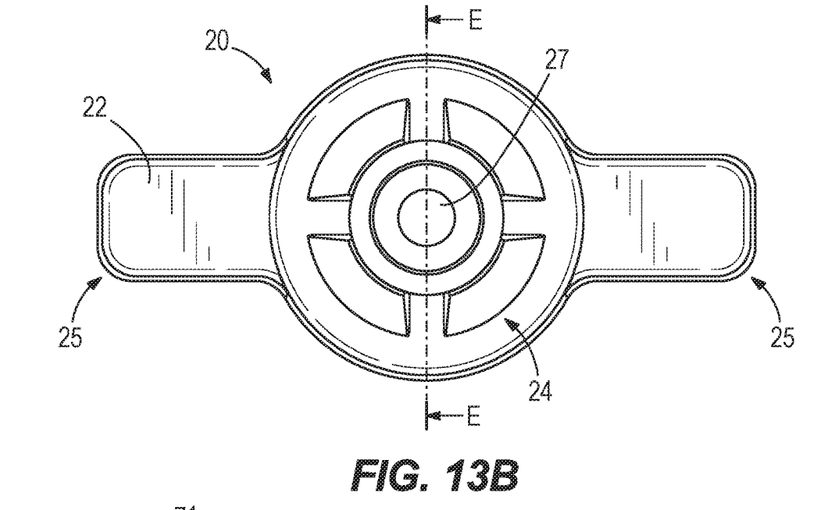
Figure 13C:
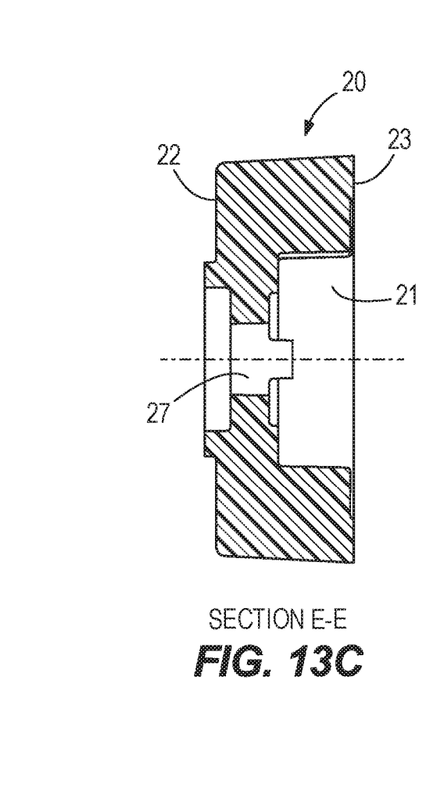
Figure 13D:
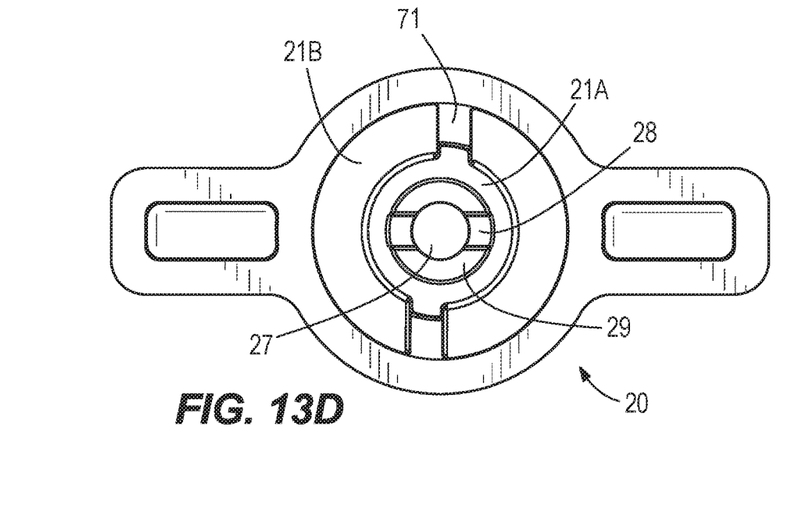

As shown in FIGS. 3A-5, the device 1 includes a main body 10 configured to be coupled to an accessory (not shown) either directly, or by providing an accessory mount 2, such as an opening for attaching a rope (see FIG. 11A). The main body 10 has a front 12 and a back 13, left 14 and right 15, and top 16 and bottom 17. In the embodiment shown, the main body 10 may be further characterized as having a first segment 11A and a second segment 11B, which in this case are provided at an angle to each other. The main body 10 further defines an axle opening 19 (FIG. 4) that extends through the main body 10 between the front 12 and the back 13.

The device 1 further includes a track bolt 50, for locking the device 1 to the track 4 in the manner previously described for cam systems known in the art. With reference to FIGS. 9A-9D, the track bolt 50 has an axle 52 that extends between a front end 54 and a back end 56, and the axle 52 is rotatably received within the axle opening 19 (FIG. 4) in the main body 10 such that the track bolt 50 may rotate. The track bolt 50 has a head 60 at the back end 56 that has a short length L1 that is less than the entrance height H1 in the track 4, and also a long length L2 that is greater than the entrance height H1 in the track 4. In certain embodiments, cutouts 66 (see FIG. 9A) are provided between the short length L1 and long length L2 to aid in smooth rotation in the track 4. In this manner, it will be recognized that the head 60 is selectively trapped or retrievable from the track 4, and particularly the entrance wall 5, depending on the rotational alignment of the head 60 relative to the entrance height H1. As will become apparent, the track bolt 50 is rotatable by handle 20, which are coupled with the engagement of features shown in FIGS. 9A-9D and 8A-8D.

At the front end 54, the track bolt 50 further includes a track bolt fixation member 35 and a track bolt fixation receiver 36, which provide for non-rotational engagement with the handle 20, which is described below. A track bolt coupler receiver 34 is also defined within the front end 54 of the track bolt 50 for coupling the handle 20 to the track bolt 50 with a track bolt coupler 30 as previously shown in FIG. 4. In certain embodiments, the track bolt coupler 30 is a threaded fastener, such as a screw. However, alternative methods of coupling are known (i.e., press fits or adhesives) or the track bolt coupler 30 may be receivable in the handle 20, for example. In this manner, rotating the handle 20 rotates the track bolt about the axle 52.

The present embodiment depicts the head 60 of the track bolt 50 to have a short length L1 that is perpendicular to the long length L2, corresponding to a 90 degree rotation of the handle 20 between the locked and unlocked positions. However, it should be recognized that other configurations are also anticipated by the present disclosure, including the short length L1 and the long length L2 of the head 60 being less than 90 degrees apart, requiring less rotation of the handle 20 to lock or unlock the device 1.

The handle 20 is defined as having a front 22 and a back 23, as well as a proximal end 24 and distal end 25. The proximal end 24 is defined as the end closer to the track bolt coupler opening 27, and the distal end 25 being the farther end from the track bolt coupler opening 27. However, as is shown in the embodiment of FIG. 11A, certain embodiments may include two distal ends 25 where the track bolt coupler opening 27 is located centrally.

Continuing with reference to FIGS. 8A-8D and 9A-9D, the handle 20 is correspondingly configured to engage with the track bolt fixation member 35 and track bolt fixation recess 36 to provide the non-rotational engagement therebetween. In the embodiment shown, a track bolt opening 29 is defined within the back 23 of the handle 20, which receives the front end 54 of the track bolt 50 and the fixation member 35 thereon. Likewise, a track bolt fixation tab 28 extends from the handle 20, which is received within the track bolt fixation recess 36 in the track bolt 50.

Likewise, the particular configuration of the mating surfaces and features for engaging the handle 20 and track bolt 50 may vary. In the embodiment shown in FIGS. 8A-8D and 9A-9D, the track bolt fixation recess 36 is defined as a substantially rectangular cutout within the front end 54 of the track bolt 50. This results in two opposing, semi-circular shaped track bolt fixation members 35 extending perpendicularly away from the bottom of the track bolt fixation recess 36.

The track bolt fixation tab 28 extending from the back 23 of the handle 20 is a prism having a shape substantially matching that of the track bolt fixation recess 36 defined in the front end 54 of the track bolt 50. Similarly, the track bolt fixation members 35 on the track bolt 50 are received within a complimentary shaped track bolt opening 29 defined within the back 23 of the handle 20. While the track bolt opening 29 is defined such that the track bolt fixation tabs 28 are parallel to each other (to match the track bolt fixation recess 36), other matching configurations are anticipated herein.

Figure 6A:
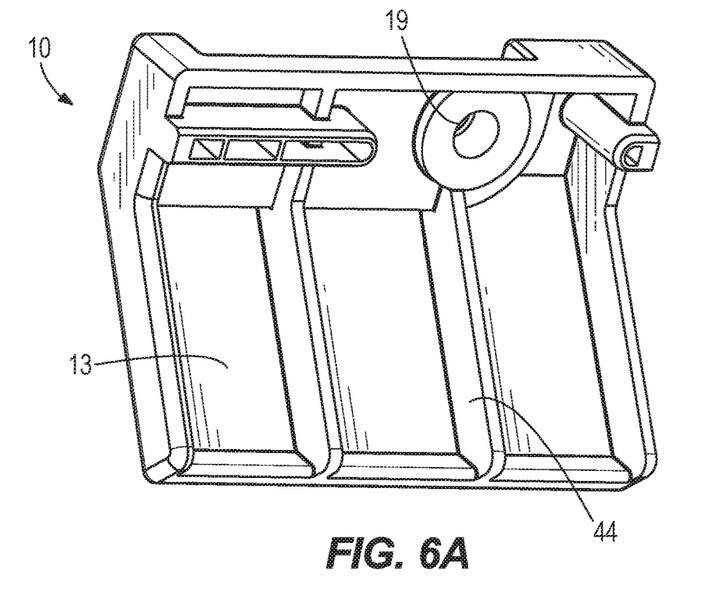
FIGS. 6A-6C depict rear isometric, front, and sectional side views of an exemplary main body for a device such as that shown in FIG. 1.
Figure 6B:
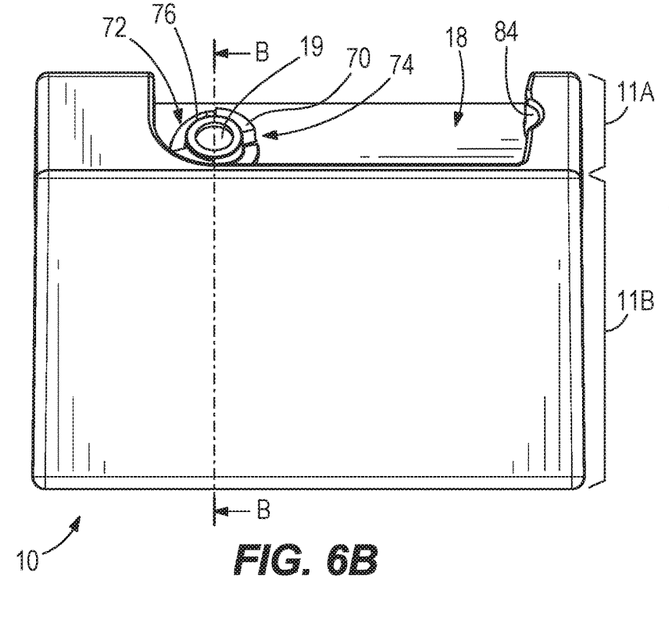
Figure 6C:
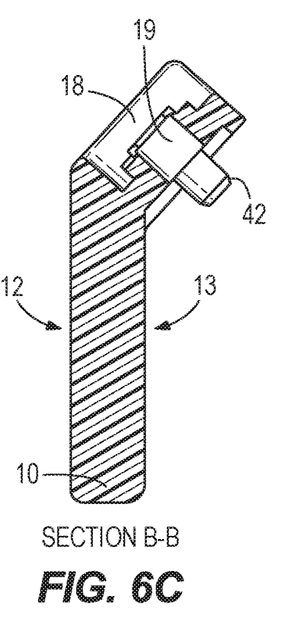
Figure 7A:
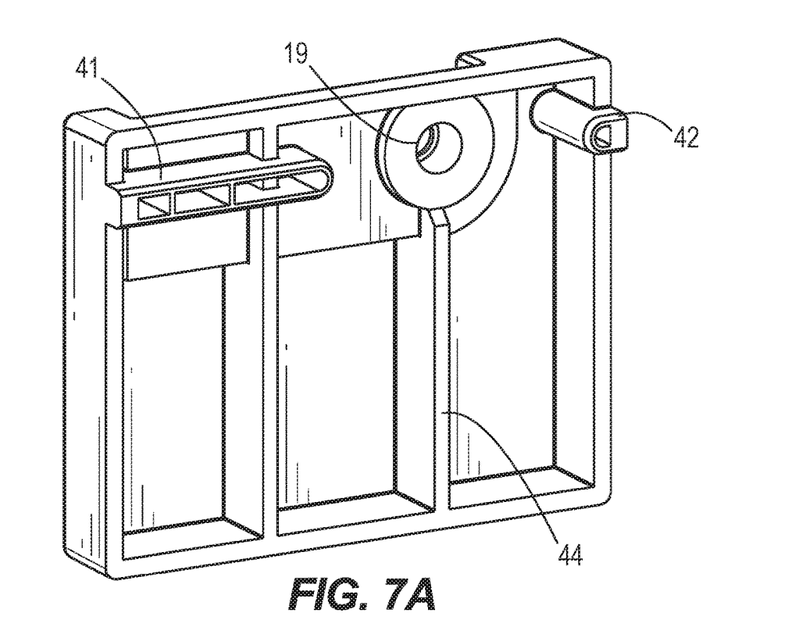
FIGS. 7A-7C depict rear isometric, rear, and side views of an alternative main body similar to the device shown in FIGS. 6A-6C.
Figure 7B:
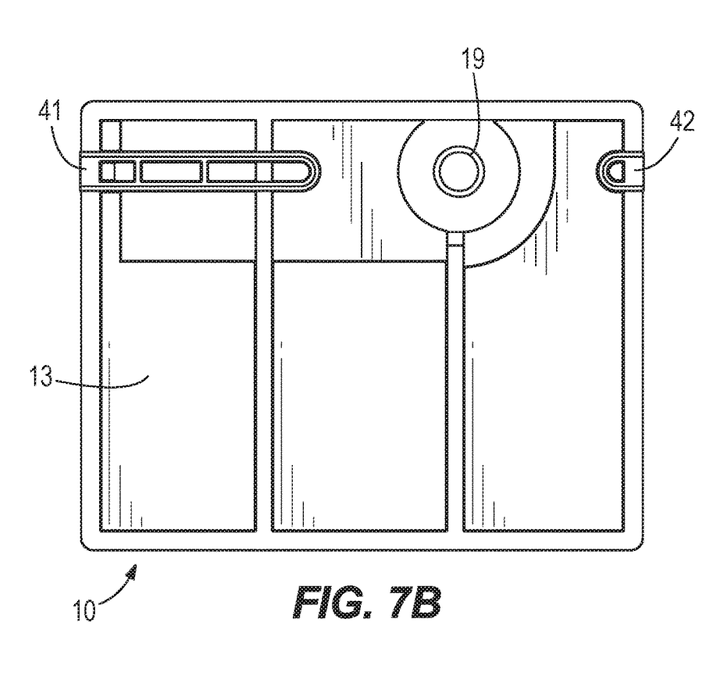
Figure 7C:
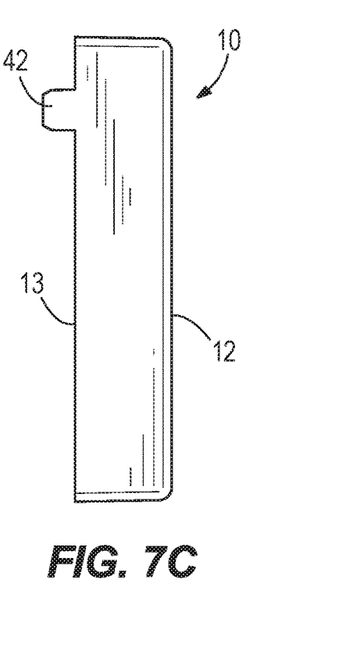
Figure 8A:
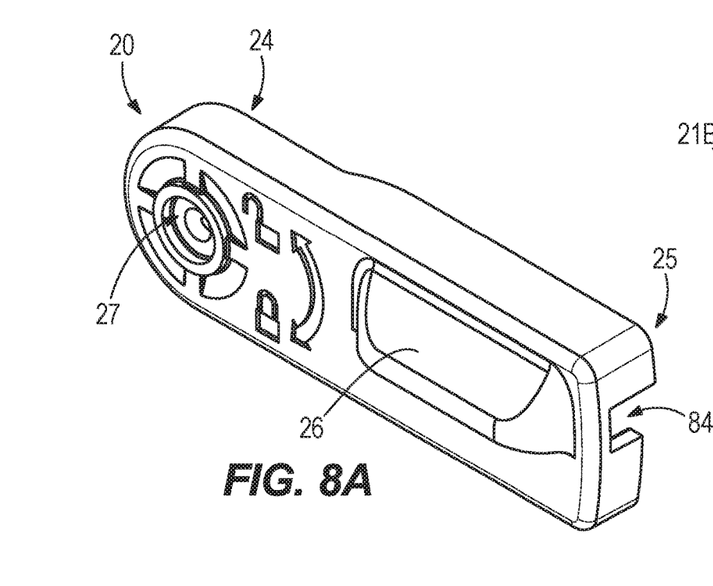
FIGS. 8A-8D depict front isometric, rear, top, and sectional side views of an exemplary handle for a device such as that shown in FIG. 1.
Figure 8B:
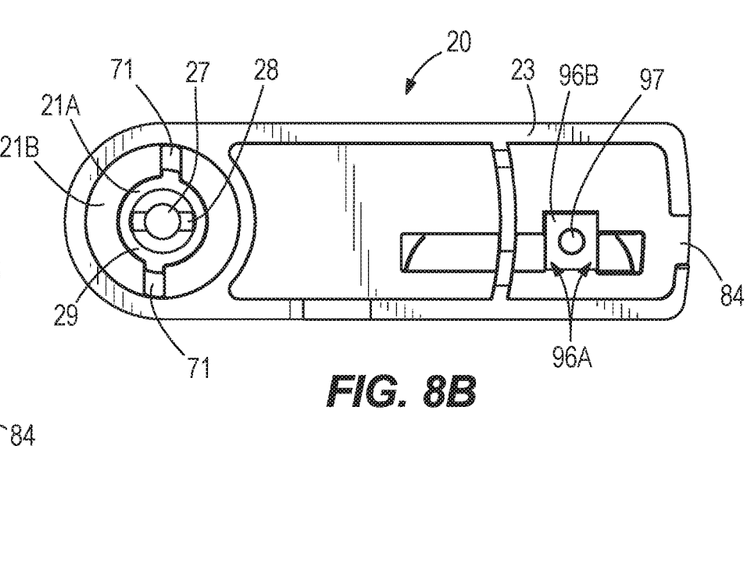
Figure 8C:
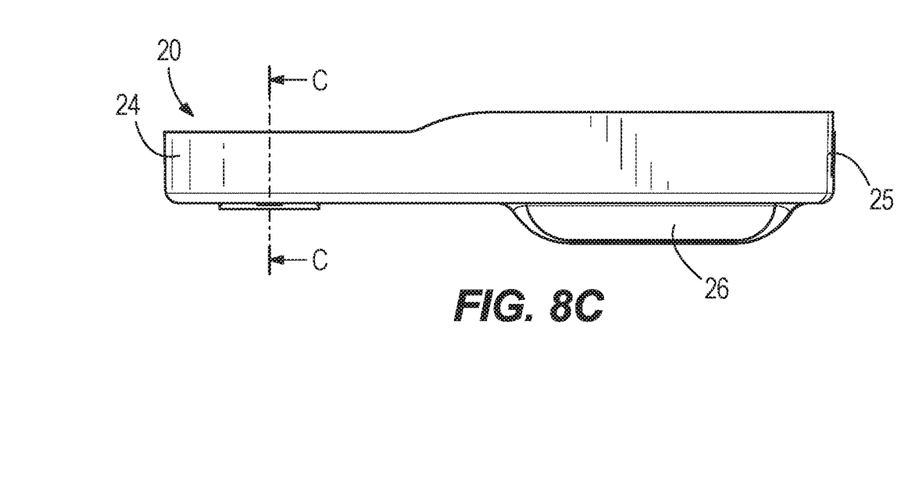
Figure 8D:
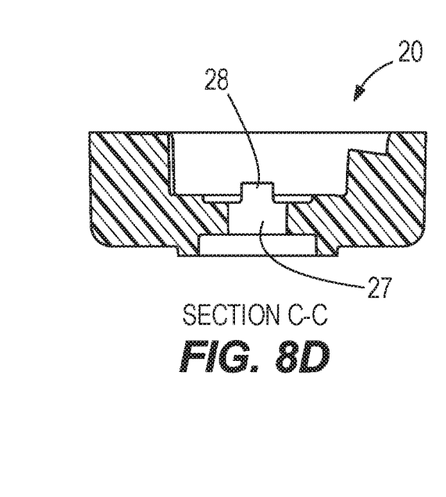
Figures 9A, 9B, 9C, 9D:
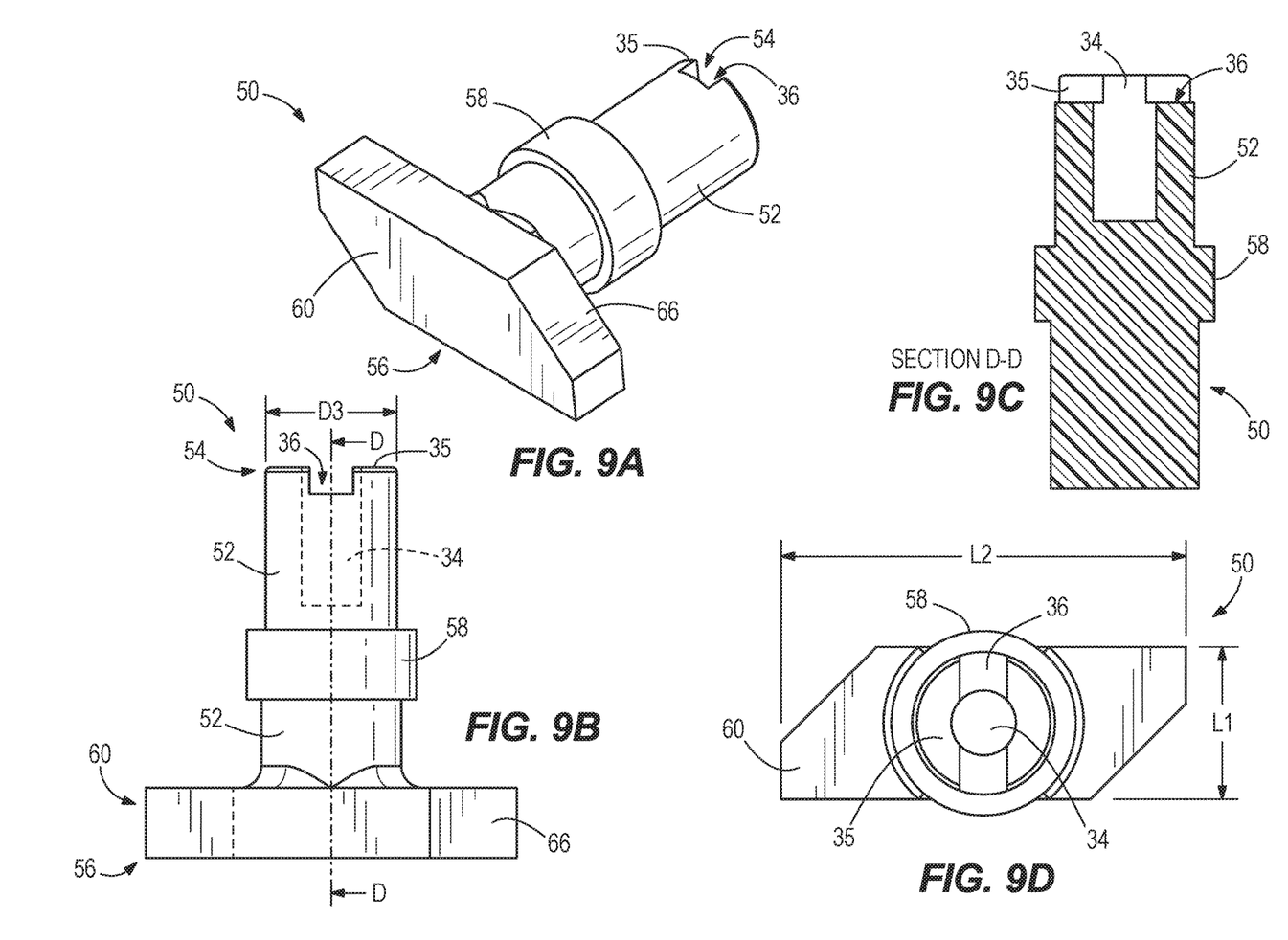
FIGS. 9A-9D depict rear isometric, top, sectional side, and rear views of an exemplary track bolt for a device such as that shown in FIG. 1.

In the embodiment shown, the back 23 of the handle 20 further defines a central core opening 21A for rotatably supporting the handle 20 via a corresponding central core 76 defined in the front 12 of the main body 10 (best seen in FIG. 6B). Likewise, a ramp opening 21B is defined in the back 23 of the handle 20 for accommodating a ramp 70 on the front 12 of the main body 10, each of which is discussed further below.

As shown in FIGS. 4-6C, the device 1 further includes a ramp 70 and riding surface 71 disposed between the handle 20 and the front 12 of the main body 10. In the embodiment shown, the ramp 70 is provided on the main body 10 and the riding surface 71 on the handle 20. However, the present disclosure anticipates other configurations, including the ramp 70 being formed on the handle 20 with a riding surface 71 formed on the main body, for example. Engagement between the ramp 70 and riding surface 74 is such that rotation of the handle 20 causes the head 60 of the track bolt 50—by virtue of being coupled to the handle 20—to be pulled or drawn in closer to the back 13 of the main body 10. The ramp 70 transitions from a low end 72 to a high end 74, whereby the riding surface 71 engages the ramp 70 and rotates thereon between the low end 72 and high end 74 to provide movement of the handle 20, and thus the head 60, relative to the main body 10.

Figure 3A:
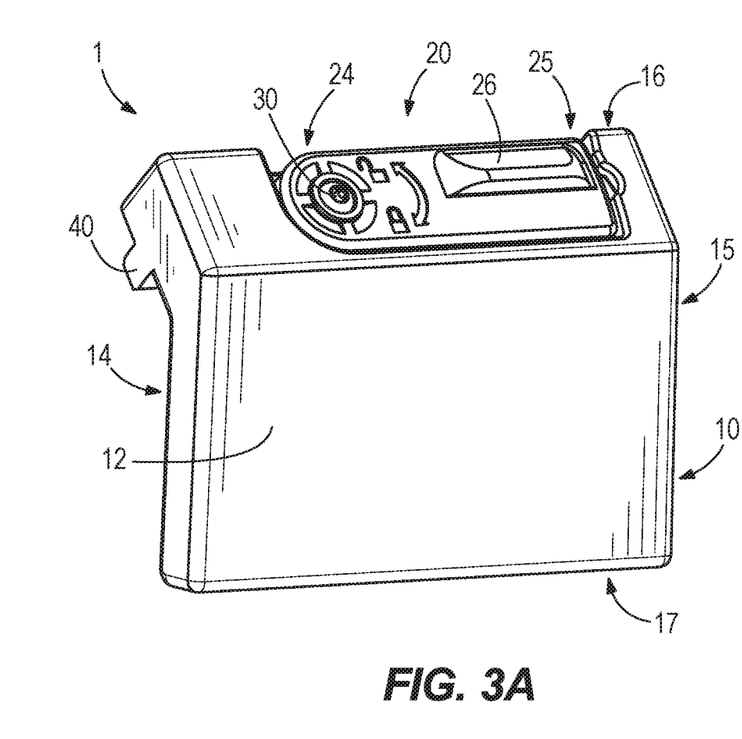
FIGS. 3A and 3B are front and back views of the device shown in FIG. 1 in a locked position.
Figure 3B:
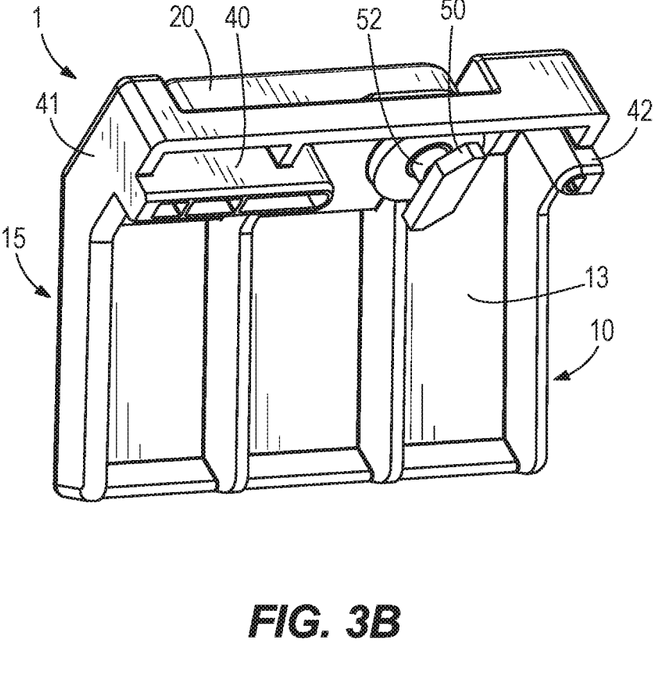
Figure 3C:
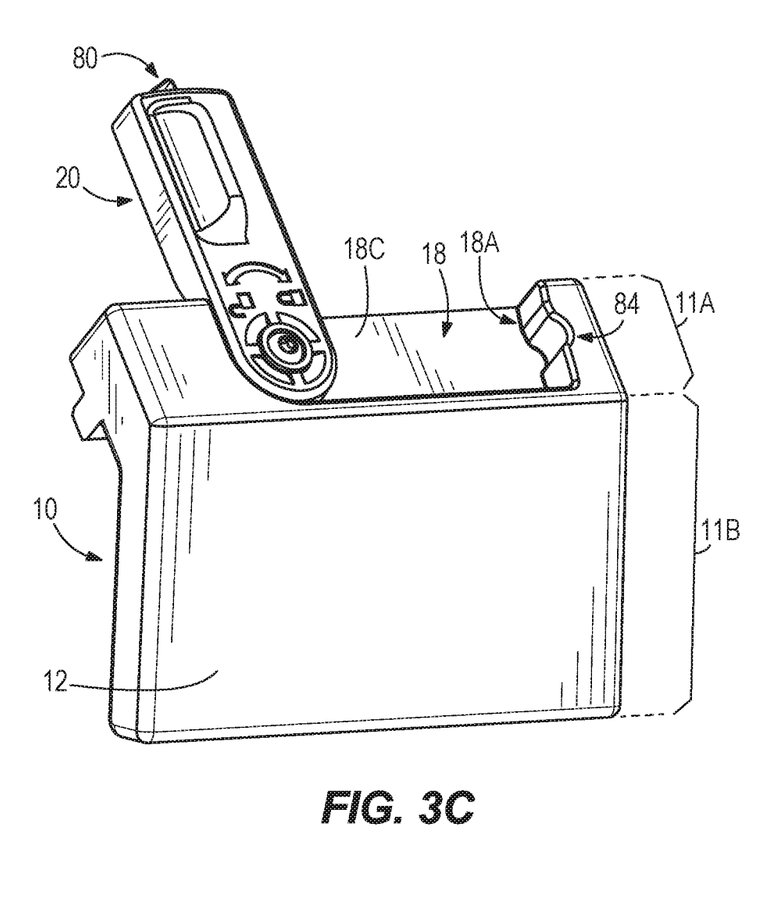
FIGS. 3C and 3D depict front and back views of the same device of FIGS. 3A and 3B in an unlocked position.
Figure 3D:
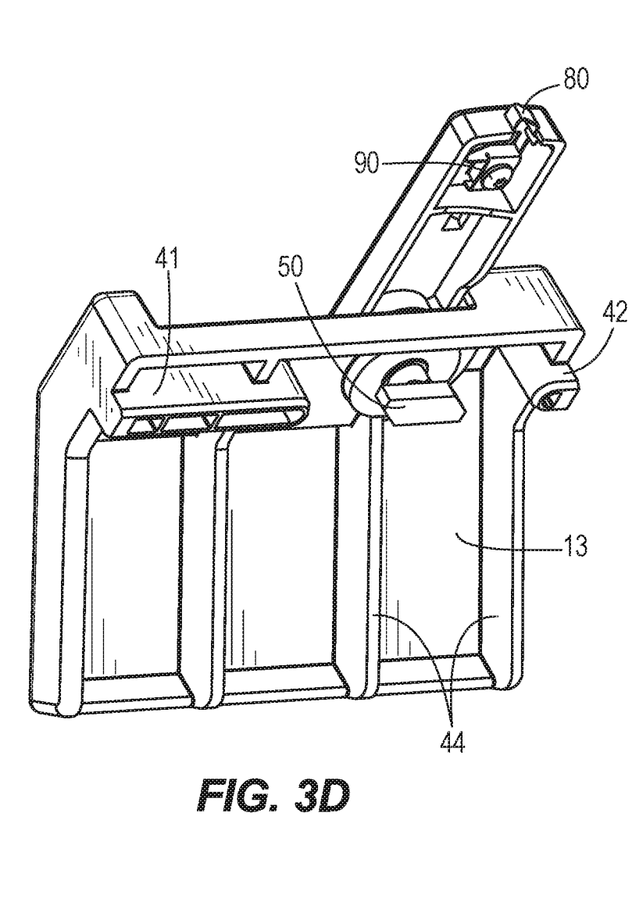

In this manner, the head 60 of the track bolt 50 is insertable into the track 4 when the handle 20 is rotated such that the riding surface 71 engages with the low end 72 of the ramp 70 (FIGS. 3C and 3D). The device 1 is then fixed to the track 4 by subsequently rotating the handle 20 such that the riding surface 71 transitions to the high end 74 of the ramp 70, wherein the head 60 is thereby drawn into compression with the entrance wall 5 of the track 4 (FIGS. 3A-3B).

Figures 4, 5:
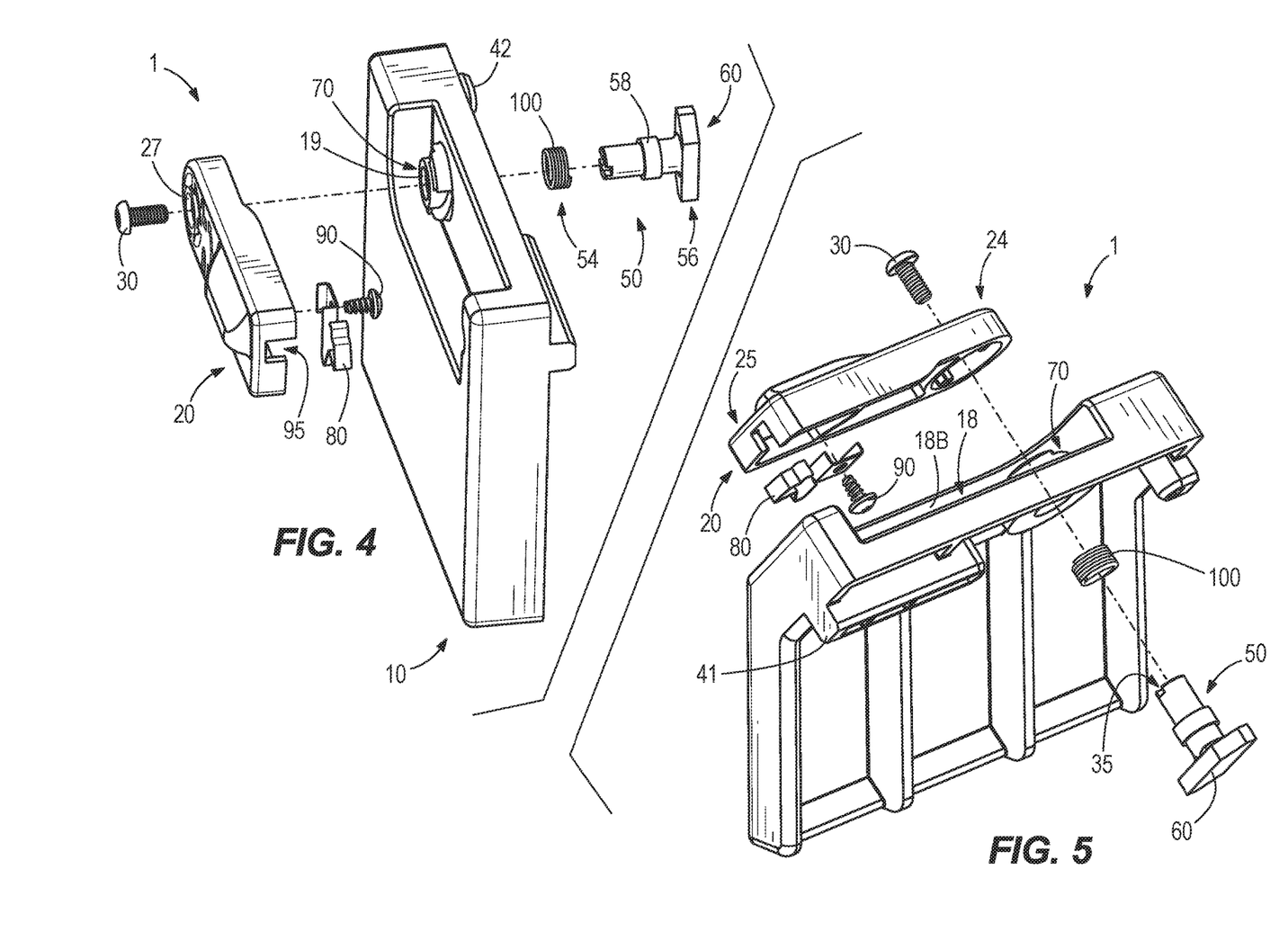
FIGS. 4 and 5 depict front and back isometric exploded views of two embodiments of devices similar to that shown in FIG. 1 according to the present disclosure.

FIGS. 4-5 further depict the incorporation of a spring 100 that biases the head 60 away from the entrance wall 5 in opposition of the ramp 70 drawing the head 60 towards the entrance wall 5 as previously discussed. In the embodiment shown, the spring 100 is disposed between the back 13 of the main body 10 and a spring retention ring 58 that is fixed to and coaxially encircles the axle 52 at a position between the front end 54 and the back end 56. The spring retention ring 58 has a larger diameter than the spring 100 to retain the spring between the main body 10 and spring retention ring 58 as stated. In this configuration, the bias provided by the spring 100 is overcome by rotating the handle 20 such that the riding surface 71 climbs the ramp 70 to the high end 74, drawing the head 60 nearer to the back 13 of the main body 10 as previously described.

As shown in FIGS. 3A-5, certain embodiments of the present disclosure further incorporate a locking member 80 between the handle 20 and the main body 10 to prevent relative rotation therebetween when the handle 20 is in the locked position. The embodiment of locking member 80 shown is an elastic material such that engagement between the handle 20 and the main body 10 is released by forcing the locking member 80 out of engagement with the main body 10.

Figure 10A:
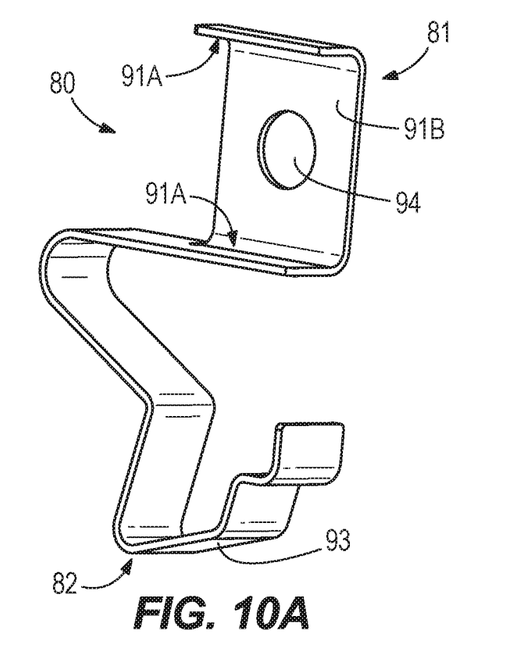
FIGS. 10A-10D depict front isometric, top pre-assembled, top assembled, and side-assembled views of a locking member optionally incorporated into a device such as that shown in FIG. 1.
Figure 10B:
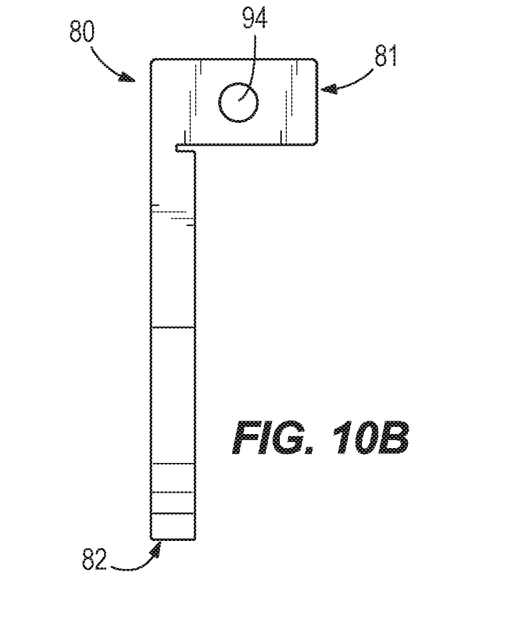
Figure 10C:
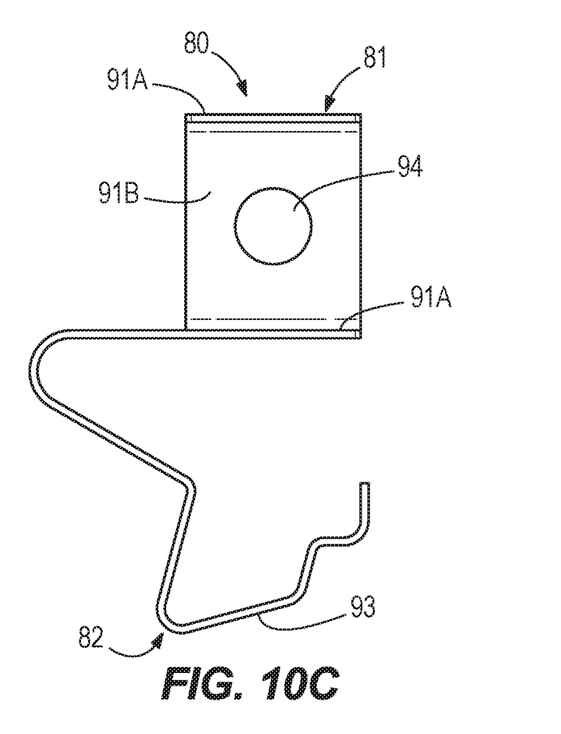
Figure 10D:
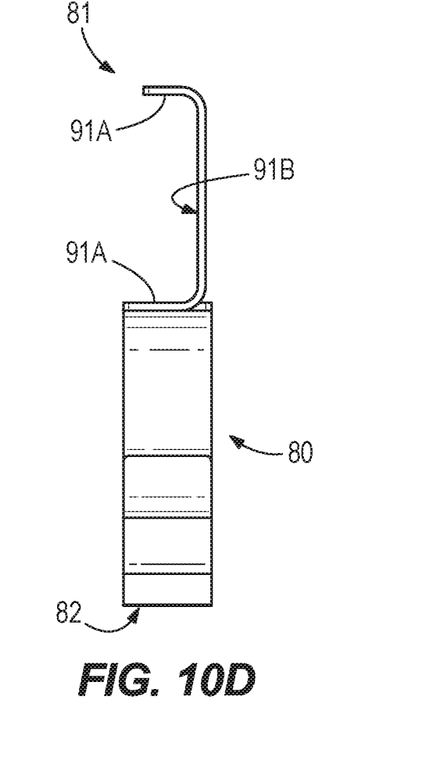

A close-up of an exemplary locking member 80, in this case a spring clip, is shown in FIG. 10A. The locking member 80 may be fabricated from a flat piece of stock as (FIG. 10B) to have a coupling end 81 and a locking end 82. In the embodiment shown, the coupling end 81 defines a locking member coupler opening 94 therein, which allows the locking member 80 to be secured to the back 23 of the handle 20 using a locking member coupler 90, such as a screw, for example.

In the present embodiment, the fixation surfaces 91A and 96A are formed at a 90° angle to the bottom surfaces 91A and 95A, respectively, wherein each is a substantially squared or rectangular planar surface. A locking member coupler receiver 97 is defined within the back 23 of the handle 20 for receiving the lock member coupler 90, though other methods for coupling these elements would be known in the art, including the locking member 80 being integrally formed with the handle 20 or main body 10 (as shown in the embodiment of FIGS. 11A-11B). To prevent rotation of the locking member 80 about this locking member coupler 90, the locking member 80 is further formed to have fixation surfaces 91A at an angle to the bottom surface 91B, which engage with like fixation surfaces 96A and a bottom surface 96B on the back 23 of the handle 20.

Returning to FIGS. 3A-3D, the locking end 82 of the locking member 80 is configured to engage with a locking member retaining groove 84 defined within the front 12 of the main body 10. In certain embodiments, the locking member 80 and locking member retaining groove 84 act as a detent by which applying additional force to the handle 20, for example pulling upwardly on the grip 26, overcomes the force provided by the locking member 80, permitting the handle 20 to rotate. This is further assisted by the incorporation of a locking member ramp 93 provided at the locking end 82. Such that the locking member 80 may disengage with the locking member retaining groove 84 simply by exerting a force on the handle 20, rather than requiring a force on the locking end 82 in direct opposition to the locking member retaining groove 84.

The embodiment further provides for a locking member notch 95 defined within the handle 20 by which the locking end 82 of the locking member 80 may extend in an exposed manner. However, it should be recognized that other mechanisms for releasably locking the handle 20 in the locked position relative to the main body 10 are also anticipated by the present disclosure. These include ball detents, or reversing the relative locations of features between the handle 20 and main body 10, for example.

Figure 1:
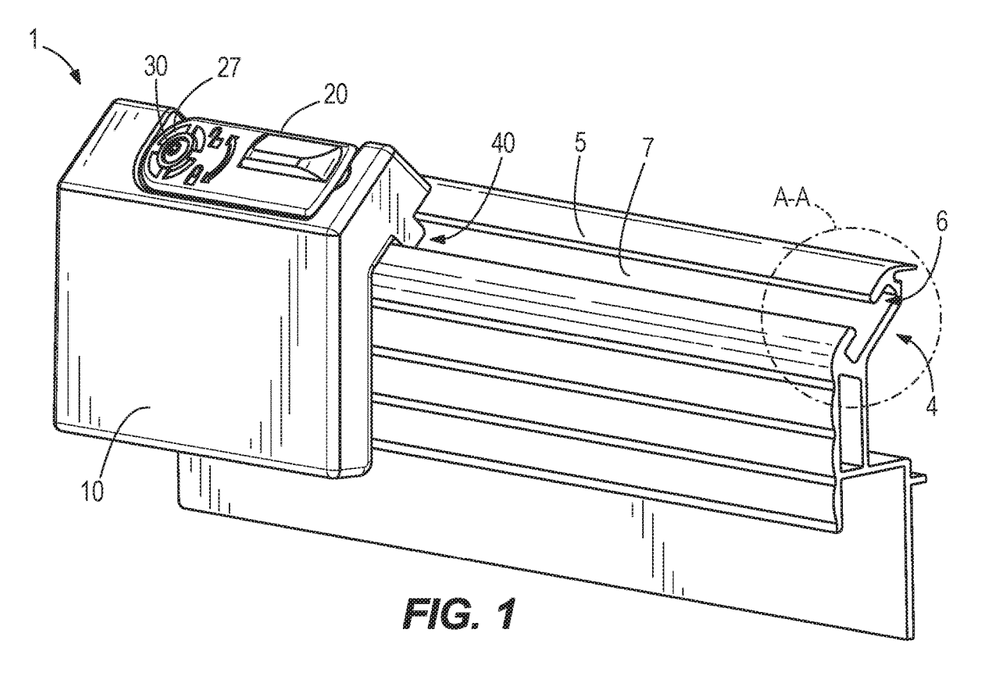
FIGS. 1 and 2 are isometric views depicting an exemplary device according to the present disclosure engaging with an exemplary track and cam system known in the art.
Figure 2:
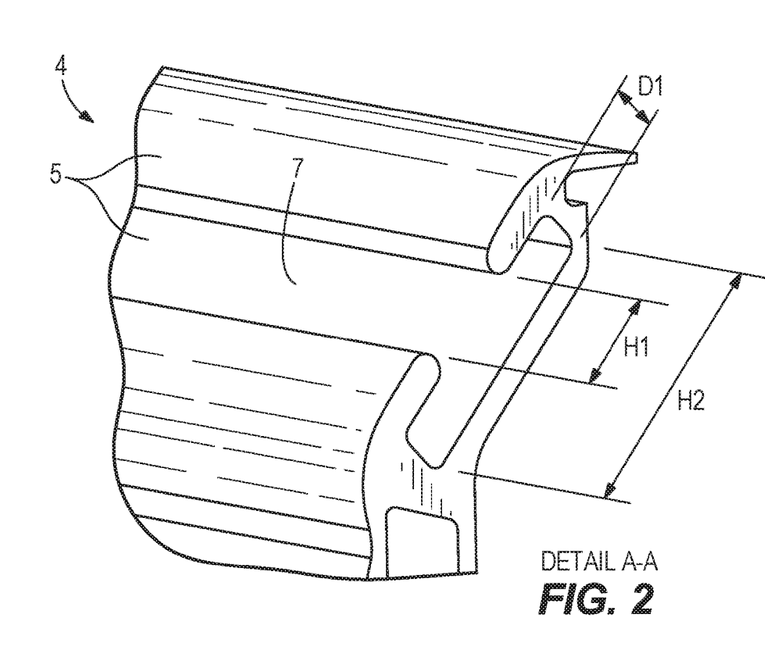

Further embodiments according to the present disclosure incorporate one or more stabilizer tabs 40 to prevent rotation or vertical movement of the device 1 relative to the track 4 during use. In the embodiment of FIGS. 3A-3D, the stabilizer tabs extend from the back 13 of the main body 10 to be received within the track 4 when the device 1 is coupled thereto. In certain embodiments, the stabilizer tabs 40 are separated into a primary tab 41 and secondary tab 42 positioned on opposite sides of the track bolt 50. By incorporating one or more stabilizer tabs 40, the present inventors have identified that rotation of the device 1 is prevented about the axle 52 of the track bolt 50 due to the additional engagement of the stabilizer tab 40 and track 4. The stabilizer tabs 40 likewise prevent vertical movement of the device 1 in the direction perpendicular to the entrance height H2 of the track 4 (FIG. 2). This also reduces the forces exerted on the track bolt 50 during use of accessories coupled to the device 1, thereby preventing damage to the track bolt 50 and components coupled thereto. In this manner, a single track bolt 50 provides for secure engagement of the device 1, rather than requiring the use of multiple track bolts 50 for a single device 1.

In certain embodiments, the main body 10 further includes a recessed handle receiver 18 for receiving the handle 20 therein. As is also shown in the embodiment of FIGS. 3A-3D, the recessed handle receiver 18 is comprised of side walls 18A (one of which optionally defining the locking member retaining groove 84 previously discussed), a bottom wall 18B, and a back wall 18C (which may include the ramp 70 formed thereon). In the embodiment shown, the sidewalls 18A are substantially rectangular and parallel to each other, but are provided at a perpendicular angle to both the bottom wall 18B and back wall 18C, which are also shown to be substantially rectangular, planar surfaces.

FIGS. 11A-13D depict an alternate embodiment of device 1 according to the present disclosure. In addition to having a handle 20 that rotates about its midpoint to rotate the track bolt 50, the device 1 further incorporates an alternative embodiment of a locking member 80 for locking the handle 20 in the locked position. In the embodiment shown, the locking member 80 is elastically formed within the front 12 of the main body 10 to retain the handle 20 in the current position of being either unlocked or locked. In this manner, additional force is required to overcome the locking member 80 to rotate the handle 20 between the locked and unlocked positions. Specifically, the locking member 80 has a romp 93 on each side that, while opposing rotation of the handle 20, may be overcome by applying a force on the handle 20 to elastically deform the locking member 80 of the rotational pat of the handle 20 (into the main body 10).

In the embodiment shown, the device 1 further includes a stop wall 77 formed within the main body 10 to prevent the handle 20 from rotating past the locked position. It should be recognized that the device 1 of FIGS. 11A-13D is shown to include the same engagement between the handle 20 and track bolt 50 discussed with respect to device 1 of FIGS. 3A-3D previously discussed. This includes a spring 100 that biases the track bolt 50 away from the main body 10, which is opposed by rotation of the handle 20, which causes the riding surface 71 defined in the back 23 of the handle 20 to ride up the ramp 70 towards the high end 74 thereof. As previously described, this in turn draws the head 60 of the track bolt 50 nearer to the main body 10 to secure the device 20 to the track 4. The device 1 shown also incorporates stabilizer tabs 40 to prevent rotation or vertical translation of the device 1 relative to the track 4, as previously described.

We claim:

1. A device for securing an accessory to a track, wherein the track has an entrance wall defining an entrance height and the track defines an interior space having an interior height, the device comprising:
   a main body configured to be coupled to the accessory, wherein the main body has a front and a back and defines an axle opening therebetween;
   a track bolt comprising an axle that extends between a front end and a head, wherein the axle is rotatably received in the axle opening, wherein the head has a long length that is greater than the entrance height and a short length that is less than the entrance height of the track;
   a handle fixed to the front end of the track bolt such that rotating the handle rotates the track bolt about the axle; and
   a ramp and a riding surface each disposed between the handle and the front of the main body, wherein the ramp transitions from a low end and a high end and the riding surface engages the ramp, and wherein rotating the handle moves the riding surface between the low end and the high end of the ramp;
   wherein when the head of the track bolt is inserted into the track and the handle is rotated such that the riding surface engages the high end of the ramp, the head is drawn into compression with the entrance wall of the track to secure the device to the track.

2. The device according to claim 1, wherein the ramp is formed on the front of the main body and the riding surface is formed on the handle.

3. The device according to claim 1, wherein the axle rotates about an axis, and wherein the long length and the short length of the track bolt are each perpendicular to the axis.

4. The device according to claim 3, wherein the long length is perpendicular to the short length.

5. The device according to claim 1, further comprising a spring positioned between the main body and the head of the track bolt, wherein the spring biases the head away from the main body.

6. The device according to claim 5, wherein the track bolt further comprises a spring retention ring that coaxially encircles the axle at a position between the front end and the head, wherein the spring retention ring has a ring diameter, wherein the spring has a spring diameter that is less than the ring diameter, and wherein the spring is retained between the main body and the spring retention ring.

7. The device according to claim 1, wherein the handle defines a handle coupler opening and the front end of the track bolt defines a handle coupler receiver, further comprising a handle coupler that extends through the handle coupler opening and engages with the handle coupler receiver to fix the handle to the track bolt.

8. The device according to claim 1, wherein the handle has a locked position in which the head of the track bolt is retained within the track and an unlocked position in which the head is removable from the track, further comprising a locking member releaseably engageable between the handle and the main body to prevent relative rotation therebetween when the handle is in the locked position.

9. The device according to claim 1, further comprising a stabilizer tab that extends from the back of the main body and is receivable within the track, wherein the stabilizer tab prevents rotation of the device about the axle when the device is secured to the track.

10. The device according to claim 1, further comprising a stabilizer tab that extends from the back of the main body and is receivable within the track, wherein the stabilizer tab prevents rotation of the device about the axle when the device is secured to the track.

11. The device according to claim 10, wherein the stabilizer tab is a first stabilizer tab, further comprising a second stabilizer tab that also extends from the back of the main body and is also receivable within the track, wherein the head of the track bolt is positioned between the first stabilizer tab and the second stabilizer tab.

12. A device for securing an accessory to a track, wherein the track defines an entrance wall having an entrance height and an interior space having an interior height, the device comprising:
   a main body configured to be coupled to the accessory, wherein the main body has a front and a back and defines an axle opening therebetween;
   a track bolt comprising an axle that extends between a front end and a head, wherein the axle is rotatably received in the axle opening, wherein the head has a long length that is greater than the entrance height of the track and a short length that is less than the entrance height;
   a handle fixed to the front end of the track bolt such that rotating the handle rotates the track bolt about the axle, wherein the handle has a locked position in which the head of the track bolt is retained within the track and an unlocked position in which the head is removable from the track; and
   a locking member releaseably engageable between the handle and the main body to prevent relative rotation therebetween when the handle is in the locked position;
   wherein the device is secured to the track when the head of the track bolt is inserted into the track and the handle is rotated to the locked position.

13. The device according to claim 12, wherein the locking member is elastic such that engagement between the handle and the main body is released by forcing the locking member out of engagement with one of the handle and the main body.

14. The device according to claim 12, wherein the locking member is formed on the front of the main body.

15. The device according to claim 10, wherein a locking member is coupled to the handle and has a free end extending therefrom, and wherein the main body defines a detent that receives the free end of the locking member therein.

16. The device according to claim 12, further comprising a stabilizer tab that extends from the back of the main body and is receivable within the track, wherein the stabilizer tab prevents rotation of the device about the axle when the device is secured to the track.

17. A device for securing an accessory to a track, wherein the track defines an entrance wall having an entrance height and an interior space having an interior height, the device comprising:
   a main body configured to be coupled to the accessory, wherein the main body has a front and a back and defines an axle opening therebetween, and wherein a stabilizer tab extends from the back of the main body and is receivable within the track;
   a track bolt comprising an axle that extends between a front end and a head, wherein the axle is rotatably received in the axle opening, wherein the head has a long length that is greater than the entrance height of the track and a short length that is less than the entrance height; and
   a handle fixed to the front end of the track bolt such that rotating the handle rotates the track bolt about the axle between a locked position in which the head of the track bolt is retained within the track and an unlocked position in which the head is removable from the track;
   wherein the device is secured to the track when the head of the track bolt is inserted into the track and rotated to the locked position, and wherein the stabilizer tab prevents rotation of the device about the axle when the device is secured to the track.

18. The device according to claim 17, wherein the stabilizer tab has a width that is greater than the long length of the head of the track bolt.

19. The device according to claim 17, wherein the stabilizer tab is a first stabilizer tab, further comprising a second stabilizer tab that also extends from the back of the main body and is also receivable within the track, wherein the head of the track bolt is positioned between the first stabilizer tab and the second stabilizer tab.

20. The device according to claim 17, wherein the stabilizer tab is integrally formed with the main body.

* * * * *